Dec. 24, 1963  M. FREEMAN  3,115,078
CAMERA
Filed July 12, 1960  2 Sheets-Sheet 1
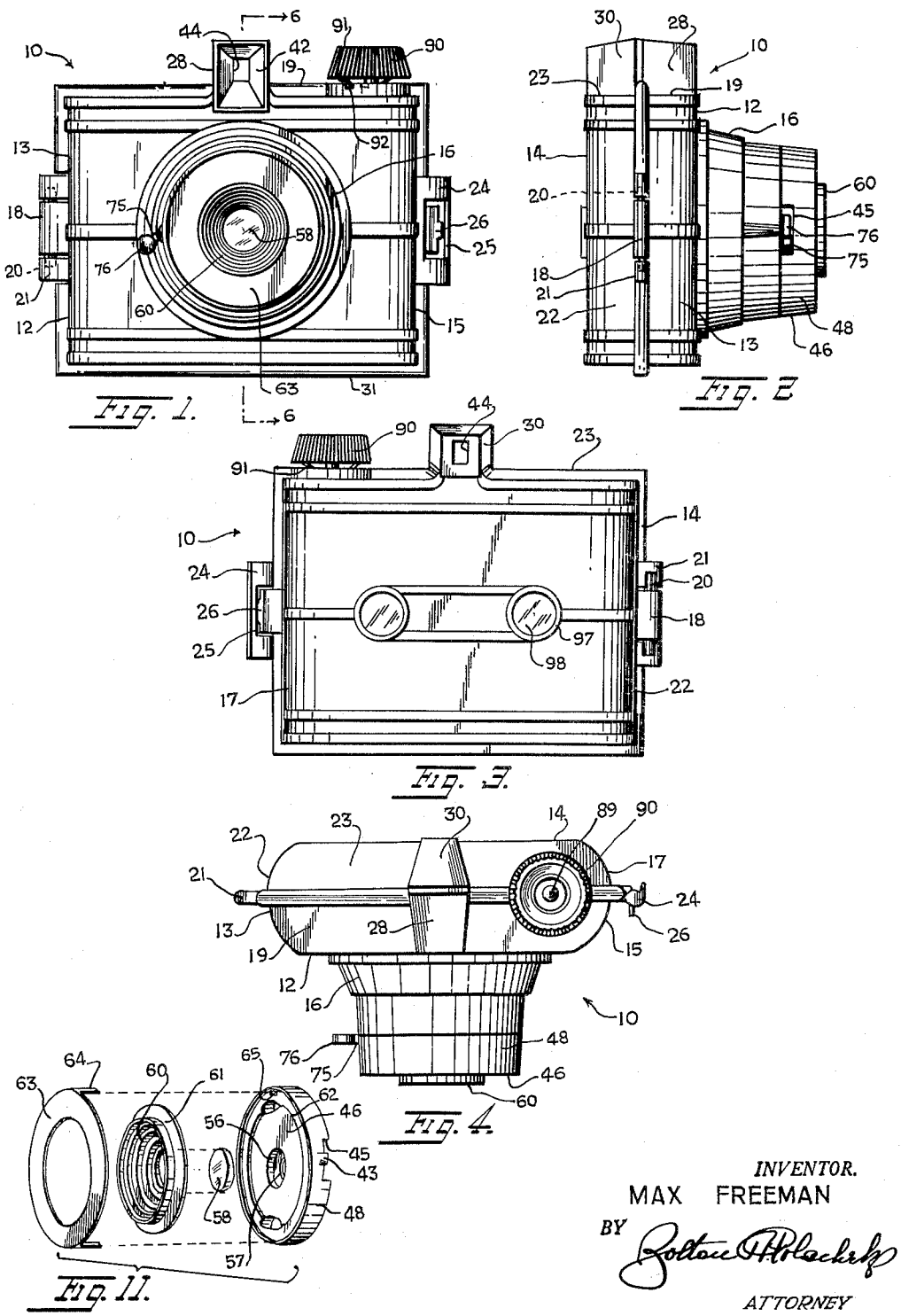
INVENTOR.
MAX FREEMAN
BY
ATTORNEY Dec. 24, 1963   M. FREEMAN   3,115,078
CAMERA
Filed July 12, 1960   2 Sheets-Sheet 2
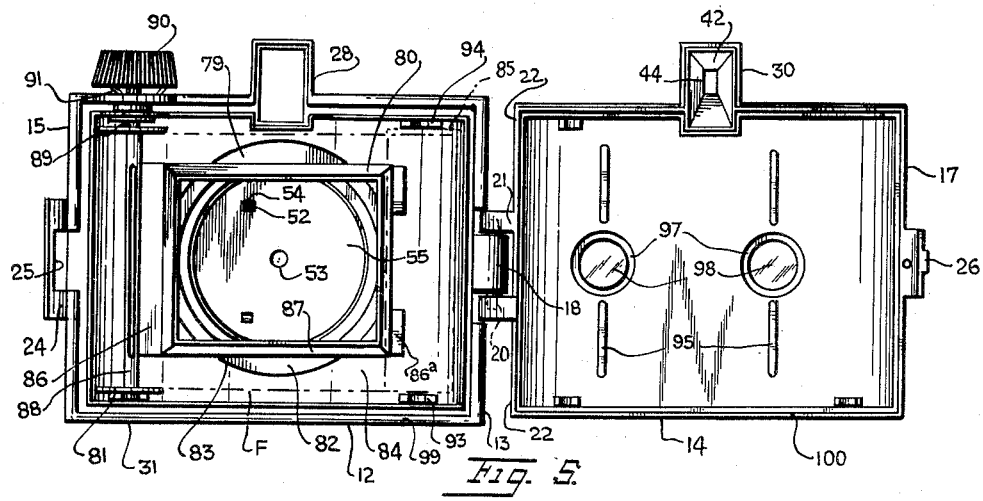
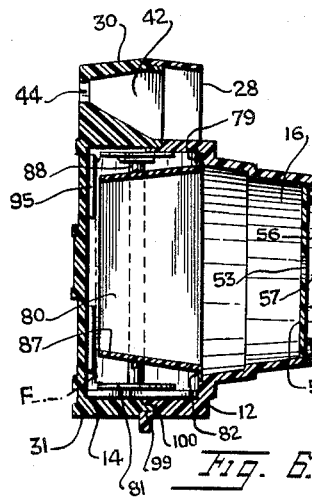
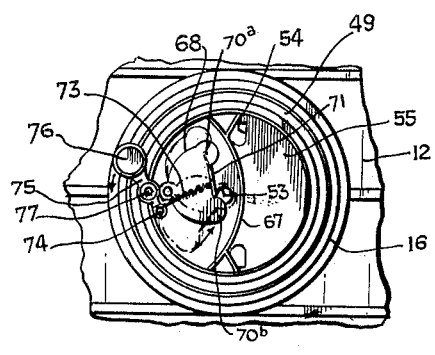
INVENTOR.
MAX FREEMAN
ATTORNEY 3,115,078
CAMERA
Max Freeman, 75 Arleigh Road, Great Neck, N.Y.
Filed July 12, 1960, Ser. No. 42,299
2 Claims. (Cl. 95—11)

This invention relates to the photographic art and particularly concerns an improved camera.

According to the invention there is provided a camera of simplified structure formed of plastic material with a simplified shutter. The camera is especially adapted for being fabricated at low cost. Due to its simplified structure it can be used by children and others inexpert in handling more elaborate photographic equipment.

It is therefore one object to provide a two-part camera case having a simplified lens holder and shutter assembly secured thereto.

A further object is to provide a camera having a two-part plastic case adapted to be opened on hinges for inserting and removing film.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front elevational view of the camera.

FIG. 2 is a side elevational view of the camera.

FIG. 3 is a rear elevational view of the camera.

FIG. 4 is a top plan view of the camera.

FIG. 5 is a rear elevational view of the camera with case in open position.

FIG. 6 is a vertical sectional view taken on line 6—6 of FIG. 1.

FIG. 7 is a perspective view of film guiding and framing member employed in the case.

FIG. 8 is a fragmentary front elevational view of the case with lens holder removed to show the shutter assembly.

FIG. 9 is a rear view of the lens holder per se.

FIG. 10 is a perspective view of the lens holder showing the rear thereof.

FIG. 11 is an exploded perspective view of components of the lens holder.

FIG. 12 is a perspective view of the shutter employed in the camera.

Referring to the drawings, there is shown a camera 10 having a case formed of interfitting rectangular front and rear sections 12, 14. The front section 12 is formed with a forwardly extending tapered barrel 16 best shown in FIGS. 1, 2, 4 and 6. At one end 13 of the front section is a hinge member 18 integrally formed thereon and having studs 20 which fit in hooks 21 formed at one end 22 of the rear section 14. A projection 24 at the other end 15 of front section 12 has an opening 25 in which engages a flexible catch element 26 integrally formed on the other end 17 of rear section 14; see FIGS. 1, 3 and 5.

A rectangular viewing frame member 28 is integrally formed with the front section at top 19 thereof. This frame interfits with a rear viewing frame member 30 formed at the top 23 of rear section 14. The frame member 30 has a tapered passage 42 terminating in a small rectangular hole 44 through which the user sights the object ahead for photographing.

The lens mount includes a circular cap 46 having a skirt 48 which seats on a shoulder 49 formed in the front end of barrel 16; see FIG. 6. Integrally formed with the rear side of cap 46 are a pair of studs 52 having hooks formed thereon for engaging in holes 54 of a web 55 located near the front of the barrel 16; see FIGS. 8, 9 and 10. The cap 46 has a recess 56 formed in its front side in which fits a lens 58; see FIGS. 6 and 11. The cap has a central hole 57. The lens is held in the recess by a flanged disk 60. Disk 60 has flange 61 fitting snugly into a recess 62 formed in the front side of cap 46. A metal ring 63 is provided with peripheral tabs 64. These tabs fit into and through holes 65 in the cap 46 and are bent over behind the cap. Skirt 48 has a cutout 45 and a radial projection 43 with hole 43$^a$.

A shutter compartment 66 is defined between the rear side of cap 46 and the front side of web 55. On web 55 is formed a curved partition 67 which serves as an abutment for shutter 68 in its upper and lower positions shown in dotted lines in FIG. 8. The shutter is disposed in compartment 66. It has a nipple 69 at its rear end (see FIG. 12) which fits into a hole in web 55. The shutter rotates on this nipple. The shutter is a flat generally U-shaped member with two outer rounded corners 70$^a$, 70$^b$.

A bent over central portion 71 is formed with a tip 72 which engages in one end of a coil spring 73. The spring is engaged on a stud 74 at one end of shutter operating lever 75. The lever pivots on a stud 77. The spring is stressed so that when the lever is pivoted counterclockwise on stud 77, as viewed in FIG. 8, shutter 68 snaps up to its uppermost position with lower corner 70$^b$ covering opening 53 in web 55. When the lever is pivoted clockwise, shutter 68 snaps down and corner 70$^a$ covers opening 53. During movement of the shutter opening 53 is cleared at central portion 71. Lever 75 has a knob 76 at its outer end operable by the finger of the user while he is sighting through frame members 28 and 30. The lever moves in recess 45 formed in skirt 48 of cap 46.

A film guide and picture framing member 80 is disposed inside the camera on the rear of front section 12. This generally rectangular member 80 as best shown in FIGS. 5, 6 and 7, is formed with a pair of curved flanges 79, 82 at top and bottom. These flanges fit frictionally into curved recesses 83 formed in the rear wall 84 of section 12. The member 80 has further end flanges 86, 86$^a$ which abut the rear wall 84. The member 80 is rectangular in cross section for framing film F indicated by dotted lines in FIGS. 5 and 6. The film will be threaded over the rear open end of member 80 between spools 81 and 85.

The empty spool 81 taking up the film is rotatably mounted near the outer or free end 15 of the front section. The shaft 88 of the spool is engaged by a stud 89 rotatably journaled at the top of section 12 and rotated by knob 90. Spring elements 91 secured to the underside of the knob are drawn over recesses 92 with inclined walls in the top 19 of the front section in ratchet fashion so that the spool 81 can be turned in only one direction; see FIGS. 1, 3, 4 and 5.

Bosses 93 and 94 inside the front section 12 at the hinged end 13 receive ends of the spool 85 loaded with film F. The film is drawn off of spool 85 on to spool 81 past the rear end of walls 87 of frame member 80 between the frame member and pairs of projections 95 molded on the inside of rear wall 96 of the rear section 14.

A pair of apertures 97 are formed in the wall 96 for viewing the back of the film. Colored transparent plastic window elements 98 are fitted in apertures 97.

Stud 77 projects forwardly beyond lever 75 and fits in hole 43$^a$ in the cap 46.

A rectangular channel 99 is formed in the end, top and bottom walls 13, 15, 19, 31 of section 12. The free ends 100 of the end, top and bottom walls of rear section 14 fit into channel 99 to provide a joint which effectively excludes light from the interior of the camera.

When the camera is in use with film F threaded over the rear end of frame member 80, shutter 63 will close opening 53 in web 55. The user will sight through the viewing frame members 28, 30 and when ready, he will move knob 76 up or down to snap the shutter past opening 53, uncovering the opening just long enough to permit the film to be properly exposed.

The film will be wound by turning knob 90 while the user observes the movement of the film through windows 98 in the back of the camera. After the film is entirely exposed and wound on spool 81, the catch 26 will be disengaged from opening 25 in projection 24 to free the hinged sections. The sections can then be opened to the position of FIG. 5 for removing the film and replacing it with a fresh roll. Empty spool 85 will then be transferred to the position of spool 81 while a new roll of film is disposed in place of spool 85.

The camera is characterized by its simplicity of construction and assembly. All essential components of the case and lens holder are formed of plastic parts which can be formed by well known molding methods at low cost.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A camera comprising a case including two hollow rectangular sections, one of said sections having a groove formed in ends of its sides, the other of said sections having free ends of its sides fitting into said groove to provide a lightproof joint, hinge means integrally formed with outer portions of said sections connecting the sections in a hinged joint, catch means integrally formed with other outer portions of the sections for securing the sections together and holding the case closed, a barrel formed on a wall of one of the sections, a cap providing a lens mounting secured on a free end of the barrel, said barrel having an apertured web formed near said free end, and a shutter assembly mounted on the barrel, said assembly comprising a generally U-shaped shutter having rounded ends for covering the aperture in said web, spring means for moving the shutter with a snap action, and a lever pivotally mounted on said web and connected with the spring means for operating the shutter to instantaneously uncover said aperture, said web and cap defining a compartment, said shutter assembly being disposed in said compartment, said web being formed with a curved partition serving as a stop member for said shutter at opposite ends of its path of movement by said spring means, said cap having a recess therein, a lens disposed in said recess, a flanged apertured disk holding the lens in said recess, and a ring disposed over the disk, said ring having tabs extending through holes in said cap holding the disk and lens on the cap, and a rectangular film guide and picture frame member removably disposed in the case, said member having curved lateral projections fitting in recesses in a wall of said one section at an inner end of said barrel, the other of said sections having a wall formed with projections for coaction with said member to define a passage for film in said case.

2. A camera comprising a case including two hollow rectangular sections, one of said sections having a groove formed in ends of its sides, the other of said sections having free ends of its sides fitting into said groove to provide a lightproof joint, hinge means integrally formed with outer portions of said sections connecting the sections in a hinged joint, catch means integrally formed with other outer portions of the sections for securing the sections together and holding the case closed, a barrel formed on a wall of one of the sections, a cap providing a lens mounting secured on a free end of the barrel, said barrel having an apertured web formed near said free end, and a shutter assembly mounted on the barrel, said assembly comprising a generally U-shaped shutter having rounded ends for covering the aperture in said web, spring means for moving the shutter with a snap action, and a lever pivotally mounted on said web and connected with the spring means for operating the shutter to instantaneously uncover said aperture, said cap having a recess therein, a lens disposed in said recess, a flanged apertured disk holding the lens in said recess, and a ring disposed over the disk, said ring having tabs extending through holes in said cap holding the disk and lens on the cap, and a rectangular film guide and picture frame member removably disposed in the case, said member having curved projections fitting in recesses in a wall of said one section at an inner end of said barrel, the other of said sections having a wall formed with projections for coaction with said member to define a passage for film in said case.

References Cited in the file of this patent

UNITED STATES PATENTS

| | | |
|---|---|---|
| 512,671 | Eddy | Jan. 9, 1894 |
| 1,397,661 | Sark | Nov. 22, 1921 |
| 2,292,217 | Drotning | Aug. 4, 1942 |
| 2,527,067 | Lessler | Oct. 24, 1950 |
| 2,554,333 | Kaplowitz | May 22, 1951 |
| 2,666,374 | Roehrig | Jan. 19, 1954 |